(12) United States Patent
Fountain, Jr. et al.

(10) Patent No.: US 10,003,937 B2
(45) Date of Patent: Jun. 19, 2018

(54) TEXT MESSAGING TO AND FROM CABLE SERVICES SYSTEM DEVICES

(75) Inventors: John Fountain, Jr., Las Vegas, NV (US); Geffrey Greg Gascay, Las Vegas, NV (US)

(73) Assignee: COX COMMUNICATIONS, INC, Atlanta, GA (US)

(*) Notice: Subject to any disclaimer, the term of this patent is extended or adjusted under 35 U.S.C. 154(b) by 176 days.

(21) Appl. No.: 12/859,952

(22) Filed: Aug. 20, 2010

(65) Prior Publication Data

US 2012/0046052 A1 Feb. 23, 2012

(51) Int. Cl.
*H04L 12/66* (2006.01)
*H04W 4/14* (2009.01)

(52) U.S. Cl.
CPC .............. *H04W 4/14* (2013.01); *H04L 12/66* (2013.01)

(58) Field of Classification Search
USPC .......................................................... 725/110
See application file for complete search history.

(56) References Cited

U.S. PATENT DOCUMENTS

| | | | |
|---|---|---|---|
| 6,732,368 B1 | 5/2004 | Michael et al. ................. | 725/34 |
| 2003/0226143 A1* | 12/2003 | Michael ................... | H04N 7/16 725/32 |
| 2006/0052113 A1* | 3/2006 | Ophir ...................... | H04W 8/02 455/456.1 |
| 2006/0225108 A1* | 10/2006 | Tabassi ............... | H04N 7/17318 725/100 |
| 2008/0076453 A1* | 3/2008 | Cai ...................... | H04L 12/5835 455/466 |
| 2008/0233982 A1* | 9/2008 | Smith .................. | H04L 12/5855 455/466 |
| 2010/0017816 A1* | 1/2010 | Martini .................. | H04N 7/173 725/31 |
| 2010/0251324 A1* | 9/2010 | Alkan ................ | H04N 7/17309 725/127 |

* cited by examiner

*Primary Examiner* — Nathan Flynn
*Assistant Examiner* — Christine Kurien
(74) *Attorney, Agent, or Firm* — Merchant & Gould P.C.

(57) ABSTRACT

Routing of short message service (SMS) communications from a networked communication device to a networked cable television (CATV) services system device (e.g., set-top box STB) is provided. SMS messages may be sent to a user's wireline phone, mobile phone, or other communication device as identified by a unique identification number (UIN). Upon identifying if the intended destination device is operative to receive SMS messages or if a provision has been made to route an incoming SMS message, the SMS message may be routed to a networked cable services system device (e.g., a set-top box or CATV-enabled telephone) associated with an account of the intended destination device. The cable services system device may receive an SMS message and may be operative to render the message on a display. In addition, the device may also be operative to send SMS messages.

20 Claims, 3 Drawing Sheets

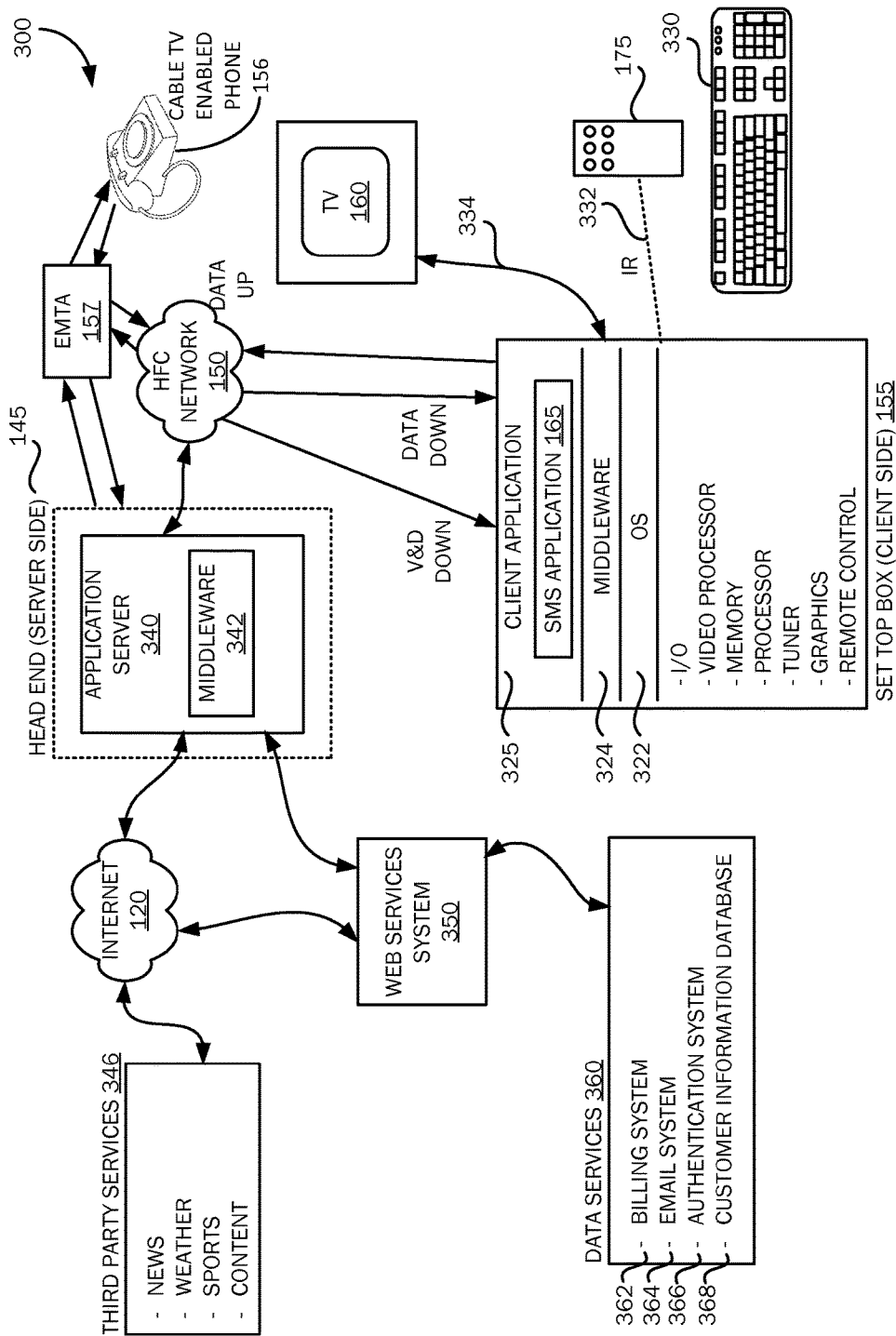

TEXT MESSAGING TO AND FROM CABLE SERVICES SYSTEM DEVICES

BACKGROUND

Short message service (SMS) is a method of communication that enables a transmission of alpha-numeric messages between two or more users of computing devices. Typically in an SMS communication, SMS messages are sent between mobile communication devices such as cell phones, PDAs, or smart phones; however, SMS may also be incorporated into web and/or traditional applications.

Today, many users are accustomed to using a mobile communication device to send and receive short messages. Although mobile communication devices such as cell phones, PDAs, and smart phones provide many conveniences, there are also some inconveniences associated with mobile communication devices, such as small display screens and small button sizes. Such inconveniences may make it more difficult to send and/or receive short messages (SMs) than if a larger display, such as a television, were used to display messages. When users are at home, they currently may not take advantage of a bigger display and/or a display that may allow them to do another activity concurrently (e.g., watch television). It may be convenient for a user to have SMs forwarded to his/her television while he/she is watching television programming on his/her television.

It is with respect to these and other considerations that the present invention has been made.

SUMMARY

Consistent with embodiments of the present invention, systems and methods are disclosed for a routing of short message service (SMS) communications from a networked communication device to a networked cable television (CATV) services system device. According to embodiments, a cable services system may be leveraged to enable a routing of short message communications from a wireline phone or wireless communication device to a networked cable services system device, such as a set-top box (STB) or CATV phone device. A SMS message that is routed to a networked CATV device may be sent from a variety of short message entities (SME). An SME is an entity which may receive or send short messages, and may include but is not limited to a cell phone, personal digital assistant (PDA), smart phone, computer, gaming device, etc. The communication may follow a client-server model and may facilitate real-time text communications between a networked CATV device (e.g., set-top box, phone, etc.) and an associated or integrated video device (e.g. television set) and an SME.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

FIG. 3 is a block diagram of a cable television/services (CATV) system 300.

DETAILED DESCRIPTION

Figure 1:
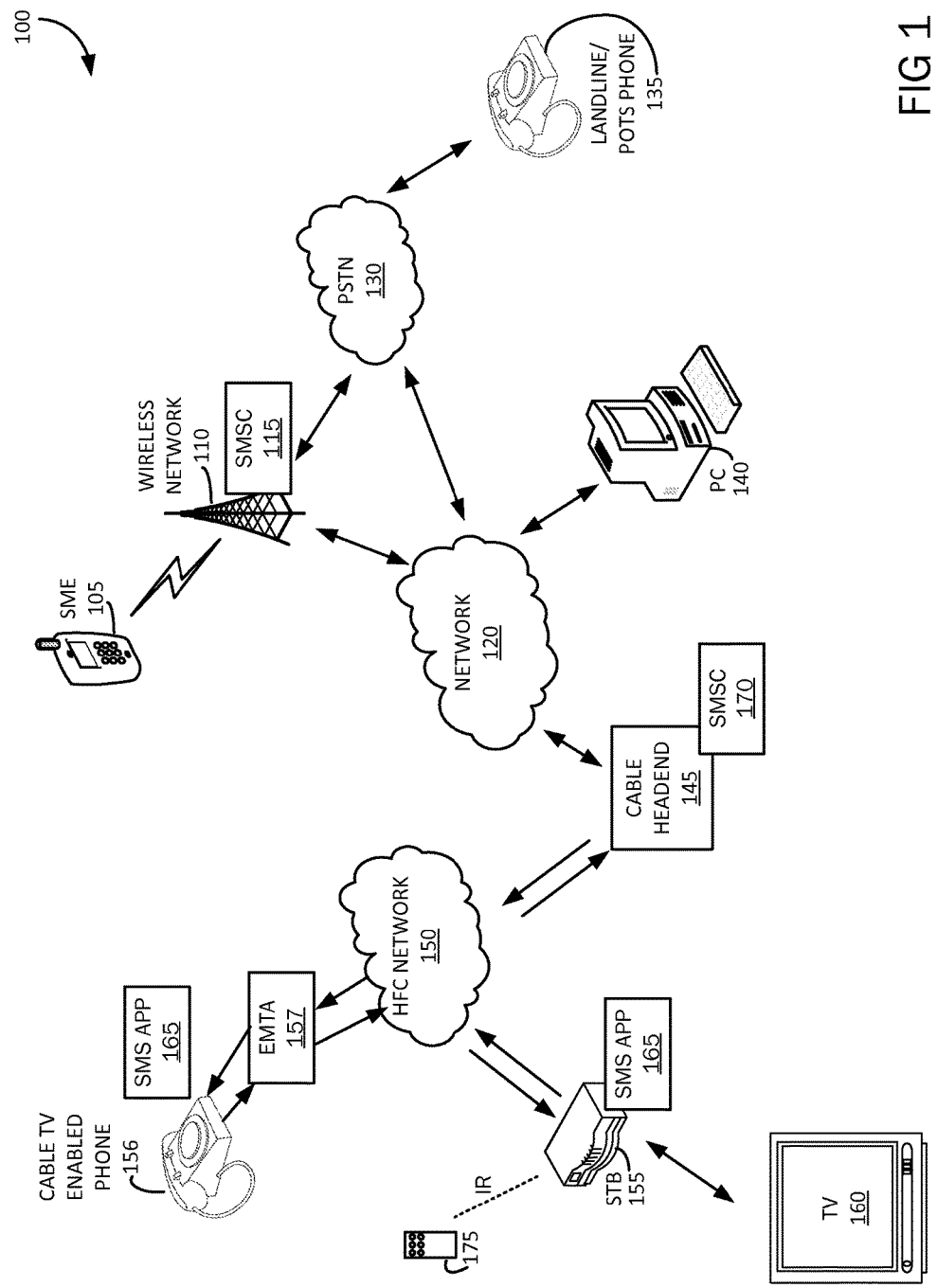
FIG. 1 is a block diagram of a distributed network 100 in which multiple networks may be interconnected.

As briefly described above, embodiments of the present invention are directed to a routing of short message service (SMS) communications from a networked communication device to a networked cable television (CATV) services system device. According to embodiments, a cable services (CATV) system as described below with respect to FIG. 3 may be leveraged to enable short message communications between a video device, for example, a cable services system set-top box or a CATV phone device, and a short message entity (SME). The term CATV device will herein be used to describe a cable-enabled networked device, such as a set-top box 155 or CATV-enabled telephone 156. An SME is an entity which may receive or send short messages, and may include but is not limited to a cell phone, personal digital assistant (PDA), smart phone, computer, gaming device, etc.

According to an embodiment, an SMS message may be intended for a CATV device, wherein a unique identification number (UIN) associated with the STB may be entered. The SMS message may be delivered to the specified STB and displayed on a television display.

According to another embodiment, an SMS message may be intended for a wireline phone, wherein an entered UIN is a wireline phone number. Upon receiving an SMS message at a head end of a network associated with the entered wireline phone number, a determination may be made that the UIN is a wireline phone number, wherein the associated wireline phone may not have SMS capabilities. A determination may be made to route the SMS message to a STB associated with an account of the intended wireline phone.

According to another embodiment, an SMS message may be intended for a wireless communication device (e.g., cell phone), wherein a UIN associated with the wireless communication device may be entered. The SMS message may be delivered to the intended wireless communication device, or, if a provision has been made to route SMS messages to another device, the SMS message may be routed to a STB associated with an account of the intended wireless communication device. According to one embodiment, a user may turn a feature on or off to route short messages to a STB. According to another embodiment, presence data may be used to route short messages to a STB according to a location of a wireless communication device in association with the STB. For example, a user may select a feature to route short messages to his/her STB when he/she is at home. Presence data may be used to determine if the user is at home based on the location of his/her wireless communication device. If it is determined that the user is at home, incoming short messages may be routed to a specified STB and displayed on an associated television. According to embodiments, a remote control device may be used to type short messages to be conveyed via a CATV network.

According to embodiments of the present invention, a cable services system may provide a variety of services across an HFC network including traditional digital and analog video programming, telephone services, high speed Internet access, video-on-demand, and information services.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

FIG. 1 is a simplified architectural block diagram of system in which short messages may be routed to a CATV device via a CATV network. As is known in the art, short messages are alpha-numeric messages which may be sent via a short message service (SMS). SMS provides a mechanism for transmitting short message to and from various short message entities (SMEs) 105, which may include, but is not limited to a cell phone, personal digital assistant (PDA), smart phone, computer, gaming device, etc. In traditional SMS communication, transport of short messages is provided by wireless networks 110 to deliver messages between short message service centers (SMSCs) 115 and wireless communication devices 105. A wireless network 110 may connect to a public switched telephone network (PSTN) 130 and/or may connect to a packet-switched network (such as the Internet) 120 via a wireless network gateway. Plain old telephone system (POTS) and wireline telephones 135 may connect to a wireless network 110 and/or the Internet via a public switched telephone network (PSTN) 130. Personal computers 140 may connect to packet-switched network 120 for various communications, such as voice, e-mail, messaging, faxing, etc. As should be appreciated, transmission technologies for delivery of voice and/or data communications over IP networks such as the Internet or other packet-switched networks is a known technology to those skilled in the art and will not be discussed in extensive detail herein.

Recently, cable set-top boxes (STB) 155 have become more than a device in which to receive digital television, but may be used to provide a variety of services, including but not limited to telephone services, high-speed Internet access, Video on Demand (VOD), and information services. By using frequency division multiplexing, an HFC network 150 may carry a variety of services, including but not limited to analog TV, digital TV, Video on Demand, telephony, and high-speed data. A STB 155 may function to receive a stream of IP packets that may carry video, voice, and/or data information for display on a connected television set 160. STB functionality may be embedded in a television 160. According to embodiments, the term "STB" is being used to describe a physical media access control (MAC) address device. This physical MAC address device may be an external STB 155, or may be a television 160 that comprises an SMS application 165. The HFC network may be operated bi-directionally, wherein signals may be carried in both directions on the same network from a head end 145 to a STB 155, and from a STB 155 to a head end 145.

Figure 2:
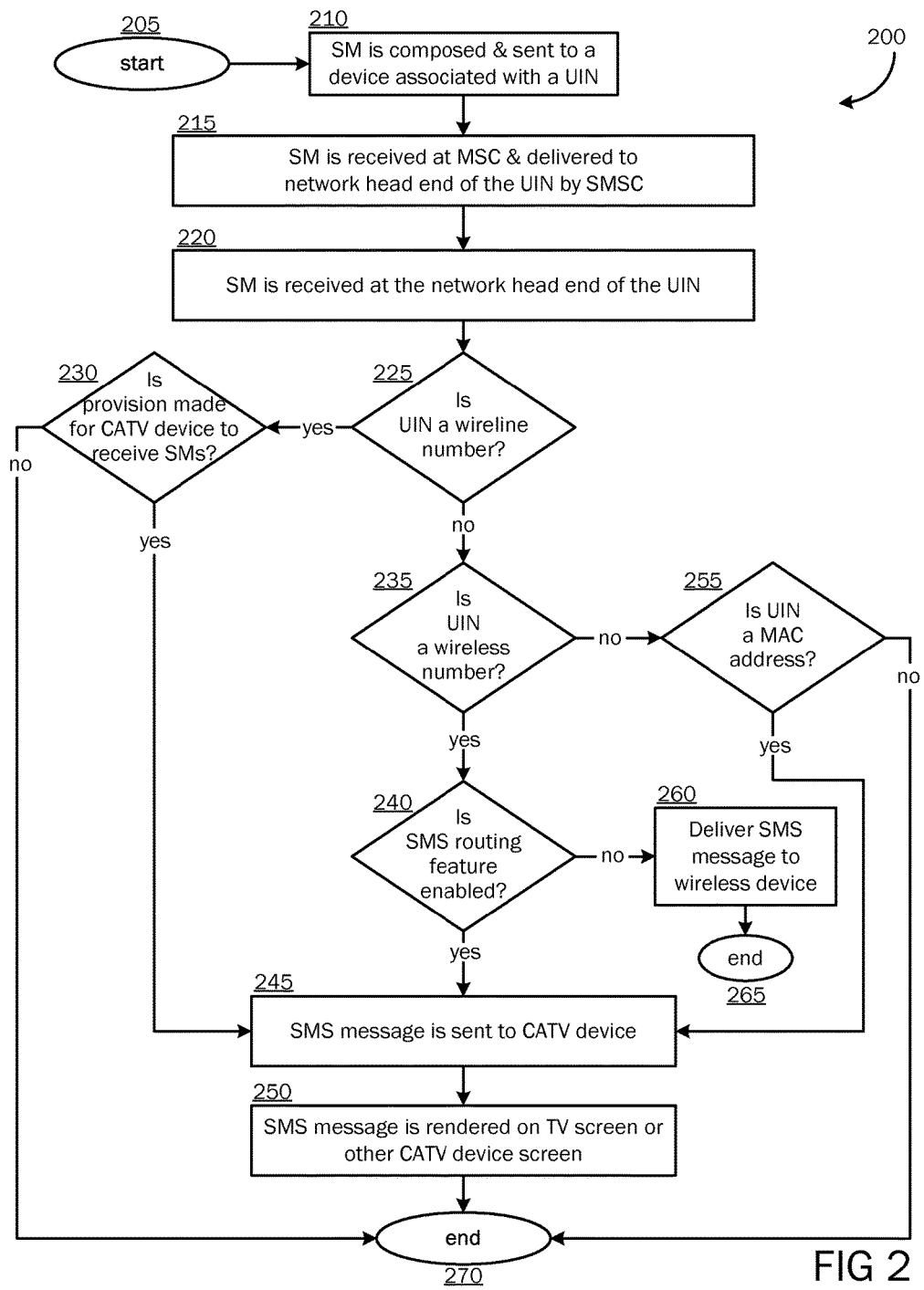
FIG. 2 is a flow diagram of a method 200 for providing short message service (SMS) communication between a networked cable services system device and a networked SME.

According to embodiments, SMS messages may also be routed to other CATV devices, such as the CATV-enabled telephone 156, illustrated in FIGS. 2 and 3. As will be described further below with respect to FIG. 3, the CATV-enabled telephone 156 may send and receive communications via a cable modem operative to pass cable telephony communications or via a voice over Internet protocol (VOIP) adapter operative to pass Internet protocol (IP) based communications to the telephone 156. According to one embodiment, the cable modem and VOIP adapter may be implemented in a single device known as an embedded multimedia terminal adapter (EMTA) 157.

According to embodiments, both the STB 155 and the CATV-enabled telephone 156 may be operative to send, receive and display short messages. An SMS application 165 may utilize traditional CATV techniques (e.g., DOCSIS, True2Way, etc.) to transfer data. According to embodiments, the SMS application 165 may be a physical application, may be hard-coded in a STB 155 or telephone 156, or may be located remotely. Short messages may be displayed on a television set 160 or other connected or integrated display device, such as on a display device of the CATV-enabled telephone 156. A user may compose or respond to a short message via a remote control device 175, or other suitable entry device or method for entering information via the STB 155. Messages may also be entered or responded to via a keypad or other suitable entry system of the telephone 156.

In the case of the STB 155, the messages may travel upstream to a head end 145, then to a short message service center (SMSC) 170 for relaying and store-and-forwarding the short message to an intended SME 105. According to embodiments, the SMSC 170 may be located at the head end 145, or may be located remotely and receive traffic from the head end 145. According to an embodiment, a database may be queried for UIN and MAC address association information so a determination may be made as to which STB may be associated with which phone number. In the case of the telephone 156, messages may be passed through the EMTA 157 and through the head end via the HFC network or directly from the EMTA 157 to the SMSC 170 via Internet communications transports.

A simplified block diagram illustrating a cable television/services system (hereafter referred to as "CATV") architecture that serves as an exemplary operating environment for the present invention will be described in further detail later in this document with reference to FIG. 3.

Having described elements of an architecture 100 that serves as an exemplary operating environment for embodiments of the present invention, FIG. 2 is a flow diagram of a method 200 for receiving and sending an SMS text message between an SME 105 and a CATV device 155, 156. The method 200 starts at OPERATION 205 and proceeds to OPERATION 210 where an SMS text message is composed and sent to an intended recipient. The user may send the SMS message to the intended recipient by entering a unique identification number (UIN) associated with a communication device of the intended recipient. A UIN may be stored in a contacts list, wherein a user may enter an intended recipient's name, and an associated UIN may be referenced when sending the message. According to embodiments, the UIN may be a phone number associated with a wireline phone, a wireless communication device, a computer, a STB, a CATV-enabled telephone, a gaming device, etc. The SMS message may comprise alpha-numeric characters, and may be entered into an SME 105, wherein an SME is a device capable of receiving or sending short messages. The SME 105 may be located in a fixed network, a mobile station, or another service center.

At OPERATION 215, the short message may be transported from the originating SME 105, and received at a mobile switching center (MSC) 110. An SMSC (Short Message Service Center) 115, which is software that may reside in an operator's network and may manage relaying and store-and-forwarding of a short message between an SME 105 and another mobile station, may interrogate a home location register (HLR), wherein routing information for an intended recipient may be received. The short message may be delivered by the SMSC 115 to a head end 145 of an intended recipient's service provider.

At OPERATION 220, the SMS message may be received at the head end 145 of the intended recipient's service provider. According to embodiments, the intended recipient's service provider may be a CATV service provider, a wireless service provider, a Web platform, etc.

At DECISION OPERATION 225, a determination may be made as to whether the SMS message is intended for a wireline phone. That is, a determination may be made as to whether an entered unique identification number (UIN) is a phone number of a wireline phone. The intended wireline phone may or may not have SMS capabilities If it is determined that the entered UIN is a phone number of a wireline phone, at DECISION OPERATION 230, a determination may be made as to whether a provision is made for SMS messages to be routed to a specified CATV device 155, 156. According to an embodiment, the determination may be based on whether an SMS application 165 is provisioned to a specified CATV device 155, 156. According to another embodiment, the determination may be based on whether an SMS routing feature is enabled on a user's account.

If a determination is made at DECISION OPERATION 230 that a specified CATV device 155, 156 is provisioned to receive SMS messages, at OPERATION 245, the SMS message may be delivered to the specified CATV device 155, 156. According to embodiments, a message may be sent to one specified CATV device 155, 156 or may be sent to multiple STBs.

If at DECISION OPERATION 225 a determination is made that the SMS message is not intended for a wireline phone, at DECISION OPERATION 235, a determination may be made as to whether the SMS message is destined for a wireless communication device 105. If a determination is made that the entered UIN is a phone number of a wireless communication device 105, at DECISION OPERATION 240, a determination may be made as to whether an SMS routing feature is enabled on the wireless communication device. According to one embodiment, a routing feature may be a selectable feature that a user may turn on or off to route SMS messages to another networked SME, such as a CATV device 155, 156. According to another embodiment, a routing feature may be based on presence data. That is, if presence data indicates that a destined wireless communication device 105 is located near a specified CATV device 155, 156, incoming SMS messages may be routed to the specified CATV device 155, 156. According to another embodiment, an SMS message may be received at both a wireless communication device 105 and an associated CATV device 155, 156.

If a determination is made a DECISION OPERATION 240 that an SMS routing feature is not enabled, or if presence data indicates that the intended wireless communication device 105 is not "at home," the SMS message may be delivered to the intended wireless communication device 105.

If a determination is made at DECISION OPERATION 240 that an SMS routing feature is enabled, and/or if a condition indicates to route an incoming SMS message to a CATV device 155, 156, at OPERATION 245, the SMS message may be routed to an associated CATV device 155, 156.

If at DECISION OPERATION 235 a determination is made that the entered UIN is not a phone number of a wireless communication device 105, then at DECISION OPERATION 255, a determination may be made as to whether the entered UIN may be a MAC address. A MAC address may be a unique identifier assigned to a user's STB 155 or TV 160. If it is determined that the entered UIN is assigned to a STB 155, at OPERATION 245, the SMS message may be delivered to the specified STB 155. According to an embodiment, if an SMS message is sent to a CATV-enabled telephone 156, the EMTA 157 may know the IP address of a device connected to it (e.g., the telephone 156 or another computing device), as well as if a connected device has a display, and if a connected device accepts SMS messages or IP packets of a particular form.

At OPERATION 250, the SMS message may be displayed on a connected television 160 screen or other display device. According to an embodiment, messages may be stored in an "inbox" until a user chooses to display a message on the television 160. The method ends at OPERATION 270.

Embodiments of the present invention may also be used to send SMS messages utilizing a CATV device 155, 156. A user may compose a message to be sent to another CATV device 155, 156 or another SME 105. SMS messages may also be sent via a CATV device 155, 156 to a billed SMS service, such as a text voting service. An account associated with the CATV device 155, 156 may be charged for billed SMS services usage. A remote control device 175 may be utilized to compose a message. A user may push buttons on a remote to type in a message, or may utilize a remote to select buttons rendered on a television screen.

As described herein, CATV devices, for example, cable services system set-top boxes 155 and CATV-enabled telephones 156 deployed in a home, business or other facility may be networked together to allow a variety of different real-time communications between networked CATV devices. According to embodiments, networked CATV devices 155, 156 deployed in a home, business or other facility may be deployed, operated, programmed and may receive content in association with a cable services system. FIG. 3 is a simplified block diagram illustrating a cable services system (hereafter referred to as "CATV") architecture that serves as an exemplary operating environment for embodiments of the present invention.

Referring now to FIG. 3, digital and analog video programming, information content and interactive television services are provided via a hybrid fiber coax (HFC) network 150 to a television set 160 for consumption by a cable television/services system customer. As is known to those skilled in the art, HFC networks 150 combine both optical fiber and coaxial cable lines. Typically, optical fiber runs from the cable head end 145 to neighborhoods of 500 to 2,000 customers. Coaxial cable runs from the optical fiber feeders to each customer. According to embodiments of the present invention, the functionality of the HFC network 150 allows for efficient bidirectional data flow between the client-side set-top box 155 and the server-side application server 340 of the present invention. As should be appreciated, embodiments of the present invention are not limited to an HFC network 150, but may include other transport mediums included, but not limited to, an all fiber system, an all coax system, and an IP Ethernet-based system.

According to embodiments of the present invention, the CATV system 300 is in the form of a distributed client-server computing system for providing video and data flow across the HFC network 150 between server-side services providers (e.g., cable television/services providers) via a server-side head end 145 and a client-side customer via a client-side set-top box (STB) functionally connected to a customer receiving device, such as the television set 160. As is understood by those skilled in the art, modern CATV systems 300 may provide a variety of services across the HFC network 150 including traditional digital and analog video programming, telephone services, high speed Internet access, video-on-demand, and information services.

On the client side of the CATV system 300, digital and analog video programming and digital and analog data are provided to the customer television set 160 via the set-top box (STB) 155. Interactive television services that allow a customer to input data to the CATV system 300 likewise are provided by the STB 155. As illustrated in FIG. 3, the STB 155 is a multipurpose computing device having a computer processor, memory and an input/output mechanism. The input/output mechanism receives input from server-side processes via the HFC network 150 and from customers via input devices such as the remote control device 175 and the keyboard 330. The remote control device 175 and the keyboard 330 may communicate with the STB 155 via a suitable communication transport such as the infrared connection 332. The STB 155 also includes a video processor for processing and providing digital and analog video signaling to the television set 160 via a cable communication transport 334. A multi-channel tuner is provided for processing video and data to and from the STB 155 and the server-side head end system 145, described below.

The STB 155 also includes an operating system 322 for directing the functions of the STB 155 in conjunction with a variety of client applications 325. For example, if a client application 325 requires a news flash from a third-party news source to be displayed on the television 160, the operating system 322 may cause the graphics functionality and video processor of the STB 155, for example, to output the news flash to the television 160 at the direction of the client application 325 responsible for displaying news items. According to embodiments of the present invention, an SMS application 165 may be executed on a STB 155. An SMS application 165 may be operative to receive and send short messages between a STB 155 and a SME 105. Messages may be displayed on a television 160 or other connected or integrated display device.

Because a variety of different operating systems 322 may be utilized by a variety of different brands and types of set-top boxes, a middleware layer 324 is provided to allow a given software application to be executed by a variety of different operating systems. According to an embodiment of the present invention, the middleware layer 324 may include a set of application programming interfaces (API) that are exposed to client applications 325 and operating systems 322 that allow the client applications to communicate with the operating systems through common data calls understood via the API set. As described below, a corresponding middleware layer is included on the server side of the CATV system 300 for facilitating communication between the server-side application server and the client-side STB 155. According to one embodiment of the present invention, the middleware layer 342 of the server-side application server and the middleware layer 324 of the client-side STB 155 format data passed between the client side and server side according to the Extensible Markup Language (XML).

The set-top box 155 passes digital and analog video and data signaling to the television 160 via a one-way communication transport 334. The STB 155 may receive video and data from the server side of the CATV system 300 via the HFC network 150 through a video/data downlink and data via a data downlink. The STB 155 may transmit data from the client side of the CATV system 300 to the server side of the CATV system 300 via the HFC network 150 via one data uplink. The video/data downlink is an "in band" downlink that allows for digital and analog video and data signaling from the server side of the CATV system 300 through the HFC network 150 to the set-top box 155 for use by the STB 155 and for distribution to the television set 160. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 3, between the HFC network 150 and the set-top box 155 comprise "out of band" data links. As is understand by those skilled in the art, the "out of band" frequency range generally lies between zero and 54 megahertz. According to embodiments of the present invention, data flow between the client-side set-top box 155 and the server-side application server 340 is typically passed through the "out of band" data links. Alternatively, an "in band" data carousel may be positioned in an "in band" channel into which a data feed may be processed from the server-side application server 340 through the HFC network 150 to the client-side STB 155. Operation of data transport between components of the CATV system 300, described with reference to FIG. 3, is well known to those skilled in the art.

According to one embodiment data passed between the CATV system backend components such as the head end 145 and the CATV system front end components such as the STB 155 may be passed according to the Data Over Cable Service Interface Specification (DOCSIS). As is well known to those skilled in the art, DOCSIS provides for a mechanism for data transport over a cable system such as the CATV 300, illustrated in FIG. 3. Among other things, DOCSIS allows for the passing of digital communications and Internet connectivity over an HFC network 150.

Referring still to FIG. 3, the head end 145 of the CATV system 300 is positioned on the server side of the CATV system and includes hardware and software systems responsible for originating and managing content for distributing through the HFC network 150 to client-side STBs 155 for presentation to customers via televisions 160. As described above, a number of services may be provided by the CATV system 300, including digital and analog video programming, interactive television services, telephone services, video-on-demand services, targeted advertising, and provision of information content.

The application server 340 is a general-purpose computing system operative to assemble and manage data sent to and received from the client-side set-top box 155 via the HFC network 150. As described above with reference to the set-top box 155, the application server 340 includes a middleware layer 342 for processing and preparing data from the head end of the CATV system 300 for receipt and use by the client-side set-top box 155. For example, the application server 340 via the middleware layer 342 may obtain data from third-party services 346 via the Internet 120 for transmitting to a customer through the HFC network 150 and the set-top box 155. For example, a weather report from a third-party weather service may be downloaded by the application server via the Internet 120. When the application server 340 receives the downloaded weather report, the middleware layer 342 may be utilized to format the weather report for receipt and use by the set-top box 155. According to one embodiment of the present invention, data obtained and managed by the middleware layer 342 of the application server 340 is formatted according to the Extensible Markup Language and is passed to the set-top box 155 through the HFC network 150 where the XML-formatted data may be utilized by a client application 325 in concert with the middleware layer 324, as described above. As should be appreciated by those skilled in the art, a variety of third-party services data, including news data, weather data, sports data and other information content may be obtained by the application server 340 via distributed computing environments such as the Internet 120 for provision to customers via the HFC network 150 and the set-top box 155.

As described above, according to embodiments, SMS messages may also be routed to other CATV devices, such as the CATV-enabled telephone 156. The CATV-enabled telephone 156 may send and receive communications via a cable modem operative to pass cable telephony communications or via a voice over Internet protocol (VOIP) adapter operative to pass Internet protocol (IP) based communications to the telephone 156. According to one embodiment, the cable modem and VOIP adapter may be implemented in a single device known as an embedded multimedia terminal adapter (EMTA) 157. As should be appreciated, cable telephony communications may be passed to the telephone 156 via a cable modem (for example, a cable modem implemented as part of the EMTA 157) via the HFC network 150, or IP-based communications may be passed to the telephone 156 via a VOIP adapter (for example, implemented as part of the EMTA 157) via the HFC network 150 or directly from the CATV system back end (e.g., head end 145). Methods and systems for providing cable-based telephony and VOIP communications to a CATV-enabled telephone 156 are well known to those skilled in the art.

According to one embodiment, the EMTA 157 may know that a device behind it (e.g., the telephone 156) has a display for displaying SMS messages or other data so that the SMS provider may send the right information and formats on the data side of the EMTA to allow for proper display on the associated device 156. According to one embodiment, the EMTA may serve as a DOCSIS-to-analog converter and may be equipped with at least two RJ11 ports to connect a physical phone 156 and at least one Ethernet port for connecting to a computing device (e.g., telephone, personal computer, etc.). The MAC address, discussed above, may also be applied to the EMTA 157 and to devices associated with the EMTA 157 (e.g., the telephone 156). That is, the EMTA 157 may know the IP addresses of devices to which it is connected. In addition, the EMTA 157 may be equipped with an analog port that may be used for passing analog signaling, for example, DTMF signals from an EMTA RJ11 port to an associated device, such as a teletype terminal for hearing impaired users. Accordingly, the EMTA 157 allows for mapping Ethernet ports of the EMTA to a subscriber SMS profile so that the CATV system 300 may have knowledge of the EMTA and associated devices (e.g., telephone 156). Thus, a user of the telephone 156 may configure the telephone 156 to accept SMS messages via the EMTA or to accept data packets of a particular form for display and to allow response via a prescribed protocol for SMS messaging.

According to embodiments of the present invention, the application server 340 obtains customer profile data from services provider data services 360 for preparing a customer profile that may be utilized by the set-top box 155 for tailoring certain content provided to the customer. According to an embodiment of the present invention, a customer profile may include communications applications provisioned on networked STBs, as well as, designations of individual STBs in a home, business or facility (e.g., "kitchen STB," "bedroom STB," "office STB," and the like).

As illustrated in FIG. 3, the services provider data services 360 include a number of services operated by the services provider of the CATV system 300 which may include data on a given customer. For example, a billing system 362 may include information such as a customer's name, street address, business identification number, Social Security number, credit history, and information regarding services and products subscribed to by the customer. An electronic mail system 364 may contain information such as electronic mail addresses, high-speed Internet access subscription information and electronic mail usage data. An authentication system 366 may include information such as secure user names and passwords utilized by customers for access to network services. The customer information database 368 may include general information about customers such as place of employment, business address, business telephone number and demographic information such as age, gender, educational level, and the like. As should be understood by those skilled in the art, the disparate data services systems 362, 364, 366, 368 are illustrated as a collection of data services for purposes of example only. The example data services systems comprising the data services 360 may operate as separate data services systems, which communicate with a web services system (described below) along a number of different communication paths and according to a number of different communication protocols.

Referring still to FIG. 3, a web services system 350 is illustrated between the application server 340 and the data services 360. According to embodiments of the present invention, the web services system 350 serves as a collection point for data requested from each of the disparate data services systems comprising the data services 360. When the application server 340 requires customer profile data from one or more of the data services 360 for preparation or update of a customer profile, the application server 340 passes a data query to the web services system 350. The web services system formulates a data query to each of the available data services systems for obtaining any available data for a given customer as identified by a set-top box identification associated with the customer. The web services system 350 serves as an abstraction layer between the various data services systems and the application server 340. That is, the application server 340 is not required to communicate with the disparate data services systems, nor is the application server 340 required to understand the data structures or data types utilized by the disparate data services systems. The web services system 350 is operative to communicate with each of the disparate data services systems for obtaining necessary customer profile data. The customer profile data obtained by the web services system is assembled and is returned to the application server 340 for ultimate processing via the middleware layer 342, as described above.

Although described herein in combination with a mobile computing device 105, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a routing of short message service (SMS) communications from a networked communication device to a networked cable television (CATV) services system device, the method comprising:
    receiving an SMS message destined to a user's communication device, the SMS message including a unique identification number associated with the user's communication device;
    determining if the user's communication device is a wireline telephone that does not have SMS message capabilities that is in communication with the networked CATV services system device via a public switched telephone network (PSTN), a wireless communication device or the networked CATV services system device, including querying a database for the unique identification number provided by the SMS message to determine whether the unique identification number is associated with the wireline telephone, the wireless communication device or the networked CATV services system device,
    if it is determined that the SMS message is destined for a wireline telephone that does not have SMS message capabilities, determining whether a SMS provisioning feature is made by the networked CATV services system device, if the SMS provisioning feature is made by the networked CATV services system device, routing the SMS message to the networked CATV service system device,
    if it is determined that the SMS message is destined for the networked CATV services system device, delivering the SMS message to the networked CATV services system device associated with the unique identification number, and
    if it is determined that the SMS message is destined for the wireless communication device, determining whether a SMS routing feature is enabled by the wireless communication device,
        if the SMS routing feature is enabled by the wireless communication device, routing the SMS message to the networked CATV services system device despite the unique identification number being associated with the wireless communication device, and
        if the SMS routing feature is not enabled, delivering the SMS message to the wireless communication device associated with the unique identification number.

2. The method of claim 1, wherein a cable television (CATV) services system device is a set-top box.

3. The method of claim 1, wherein a cable television (CATV) services system device is a television comprising an SMS application.

4. The method of claim 1, wherein a cable television (CATV) services system device is a CATV-enabled telephone.

5. The method of claim 1, further comprising displaying the SMS message on a television display coupled to the associated CATV services system device.

6. The method of claim 1, wherein determining if the SMS message should be routed to the networked CATV services system device includes determining if a communication processing instruction has been received for delivering the SMS message to the networked CATV services system device.

7. The method of claim 6, wherein the communication processing instruction received for the networked communication device includes an instruction for routing incoming SMS messages to the associated CATV services system device.

8. The method of claim 6, wherein the communication processing instruction received for the networked communication device includes an instruction for routing incoming SMS messages to the associated CATV services system device based on presence data.

9. The method of claim 8, wherein if presence data indicates that the networked communication device is within a specified distance of the associated CATV services system device, routing the incoming SMS messages to the associated CATV services system device.

10. The method of claim 1, further comprising sending a SMS communication from the networked cable television (CATV) services system device to the wireless communication device.

11. A system for providing a routing of short message service (SMS) communication from a networked communication device to a networked cable television (CATV) services system device, the system comprising:
    a networked communication device operative to transmit an SMS message directed to a user's communication device, the SMS message including a unique identification number associated with the user's communication device;
    a short message service center operative:
        to receive an SMS message destined to a user's communication device;
        to determine if the user's communication device is a wireline telephone that does not have SMS message capabilities that is in communication with the networked CATV services system device via a public switched telephone network (PSI N), a wireless communication device or the networked CATV services system device, including querying a database for the unique identification number provided by the SMS message to determine whether the unique identification number is associated with the wireline telephone, the wireless communication device or the networked CATV services system device, if it is determined that the SMS message is destined for the wireline telephone that does not have SMS message capabilities, determining whether a SMS provisioning feature is made by the networked CATV services system device, if the SMS provisioning feature is made by the networked CATV services system device, routing the SMS message to the networked CATV service system device, if it is determined that the SMS message is destined for the networked CATV services system device, delivering the SMS message to the networked CATV services system device associated with the unique identification number, and if it is determined that the SMS message is destined for the wireless communication device, determining whether a SMS routing feature is enabled by the wireless communication device, if the SMS routing feature is enabled by the wireless communication device, routing the SMS message to the networked CATV services system device despite the unique identification number being associated with the wireless communication device, and if the SMS routing feature is not enabled, delivering the SMS message to the wireless communication device associated with the unique identification number.

12. The system of claim 11, wherein the networked CATV services system device is a set-top box.

13. The system of claim 11, wherein the networked CATV services system device is a television comprising the SMS application.

14. A method for providing a routing of short message service (SMS) communications from a networked communication device to a networked cable television (CATV) services system device, the method comprising:

receiving an SMS message including a unique identification number associated with a user's communication device;

querying a database for the unique identification number to determine a type for the user's communication device associated with the unique identification number;

if it is determined that the type is a wireline communication device that does not have SMS message capabilities, determining whether an SMS provisioning feature is made by the CATV services system device, and if so, routing the SMS message from the wireline communication device to be delivered to the networked CATV service system device;

if it is determined that the type is a wireless communication device, determining whether an SMS provisioning feature is made by the CATV services system device;

if so, routing the SMS message from the wireless communication device to deliver the SMS message to the networked CATV service system device despite the unique identification number being associated with the wireless communication device;

if not, delivering the SMS message to the wireless communication device associated with the unique identification number; and if it is determined that type is a CATV device, delivering the SMS message to the networked CATV services system device associated with the unique identification number.

15. The method of claim 14, wherein routing the SMS message from the wireless communication device to deliver the SMS message to the networked CATV service system device, further comprises delivering the SMS message to the wireless communication device.

16. The method of claim 14, wherein delivering the SMS message to the networked CATV services system device associated with the unique identification number, further comprises delivering the SMS message to a second networked CATV services system device associated with the networked CATV services system device.

17. The method of claim 14, wherein the wireline communication device is a Plain Old Telephone System (POTS) device in communication with the CATV services system device via a public switched telephone network (PSTN), wherein the wireline communication device does not provide SMS capabilities on its own.

18. The method of claim 14, wherein the CATV services system device is operable to compose and send SMS messages.

19. The method of claim 14, wherein the unique identification number is associated with a MAC address assigned to a television, a set-top box, or the user's communication device.

20. The method of claim 14, wherein the unique identification number is a phone number for the wireline communication device.

* * * * *